United States Patent
Varelas et al.

(10) Patent No.: US 7,158,517 B2
(45) Date of Patent: Jan. 2, 2007

(54) METHOD AND APPARATUS FOR FRAME-BASED PROTOCOL PROCESSING

(75) Inventors: Oreste B. Varelas, Vancouver (CA); Barry K. Tsuji, Burnaby (CA)

(73) Assignee: Intel Corporation, Santa Clara, CA (US)

(*) Notice: Subject to any disclaimer, the term of this patent is extended or adjusted under 35 U.S.C. 154(b) by 1231 days.

(21) Appl. No.: 09/862,141

(22) Filed: May 21, 2001

(65) Prior Publication Data

US 2002/0172227 A1 Nov. 21, 2002

(51) Int. Cl.
*H04L 12/28* (2006.01)

(52) U.S. Cl. ............... 370/392; 370/465; 370/474

(58) Field of Classification Search ........... 370/351, 370/352, 353, 354, 389, 392, 395.1, 395.51, 370/396
See application file for complete search history.

(56) References Cited

U.S. PATENT DOCUMENTS

| | | | |
|---|---|---|---|
| 5,210,762 A | 5/1993 | Weeber et al. | |
| 5,465,252 A | 11/1995 | Muller | |
| 5,535,219 A | 7/1996 | Freitas | |
| 5,568,486 A | 10/1996 | Huscroft et al. | |
| 5,717,693 A | 2/1998 | Baydar et al. | |
| 5,809,032 A | 9/1998 | Weeber et al. | |
| 5,841,760 A | 11/1998 | Martin et al. | |
| 5,898,887 A | 4/1999 | Hansen | 395/821 |
| 5,907,682 A | 5/1999 | Miyazawa | |
| 5,917,818 A * | 6/1999 | Ko et al. | 370/377 |
| 5,923,653 A | 7/1999 | Denton | 370/375 |
| 5,978,377 A * | 11/1999 | Kim et al. | 370/395.71 |
| 6,034,947 A * | 3/2000 | Yoshida et al. | 370/244 |
| 6,061,328 A * | 5/2000 | Read et al. | 370/216 |
| 6,188,685 B1 | 2/2001 | Wolf et al. | |
| 6,201,798 B1 * | 3/2001 | Campanella et al. | 370/326 |
| 6,314,097 B1 | 11/2001 | Ohara | |
| 6,405,250 B1 * | 6/2002 | Lin et al. | 709/224 |
| 6,526,069 B1 | 2/2003 | Wolf et al. | |
| 6,647,004 B1 * | 11/2003 | Allen et al. | 370/335 |
| 6,654,373 B1 * | 11/2003 | Maher et al. | 370/392 |
| 6,693,918 B1 | 2/2004 | Dallabetta et al. | |
| 6,721,315 B1 * | 4/2004 | Xiong et al. | 370/389 |
| 6,765,928 B1 | 7/2004 | Sethuram et al. | |
| 6,826,185 B1 * | 11/2004 | Montanaro et al. | 370/395.1 |
| 6,895,018 B1 | 5/2005 | Klish, II | |
| 2001/0001002 A1 | 5/2001 | Sugawara et al. | 370/474 |
| 2002/0133698 A1 * | 9/2002 | Wank | 713/151 |

(Continued)

FOREIGN PATENT DOCUMENTS

EP  0 705 050  4/1996

(Continued)

OTHER PUBLICATIONS

Fuqiang, et al., "A SDH STM-N Processor for Overhead Terminating and PDH Interface," High Technology Letter, 5(1), Jun. 1999, 25-28.

(Continued)

*Primary Examiner*—Phirin Sam
(74) *Attorney, Agent, or Firm*—Grossman, Tucker, Perreault & Pfleger, PLLC

(57) ABSTRACT

A method and apparatus for an overhead processing system is described. More particularly, frame latency is used to process less time-critical overhead with the overhead processing system. Such a system uses less semiconductor wafer area and consumes less power than processing all overhead in a time-critical manner using flip-flops and the like.

14 Claims, 11 Drawing Sheets

U.S. PATENT DOCUMENTS

2002/0157060 A1* 10/2002 Beacken et al. ............ 714/784
2002/1072225     11/2002 Ang et al.
2003/0007491 A1*  1/2003 Read et al. ............. 370/395.1
2003/0031204 A1   2/2003 Ho et al.
2004/0174870 A1   9/2004 Viks et al.

FOREIGN PATENT DOCUMENTS

EP      0705050 A2   4/1996
WO      96/41435    12/1996

OTHER PUBLICATIONS

Hamlin, et al., "A SONET/SDH Overhead Terminator for STS-3, STS-3C, and STM-1,"IEEE J. Solid-State Circuits, 28(3), Mar. 1993, 276-281.

European Patent Office, Communication Pursuant to Article 96(2) EPC, regarding European Application No. 01 957 653.7—1237, 3 pages, Aug. 6, 2004.

"International Search Report and Written Opinion of the Inernational Searching Authority; Dated Jan. 17, 2006; PCT/US2005/035378", (Jan. 17, 2006), 12 pg.

* cited by examiner

METHOD AND APPARATUS FOR FRAME-BASED PROTOCOL PROCESSING

BACKGROUND OF THE INVENTION

1. Field of the Invention

This invention relates to network communications, and, more particularly, to processing a frame-based or packet-based, with approximately periodic overhead, protocol.

2. Description of the Related Art

To accommodate increasing demand for bandwidth, optical networking has become more prevalent. Two well-known types of optical networks are Synchronous Optical Network (SONET) and Synchronous Digital Hierarchy (SDH). Sometimes such networks are referred to as broadband networks, namely, networks capable of supporting interactive multimedia applications, as mentioned in "SONET" (Second Edition) by Walter J. Goralski ("Goralski"), at pages 20–23. As SONET and SDH have similar frame overhead configurations, for purposes of clarity, the remainder of this specification will tend to be disclosed in terms of a synchronous optical network using SONET. However, it will be appreciated by those of skill in the art, that this specification is equally applicable to other types of synchronous optical networks, including but not limited to SDH and other frame-based protocols having approximately periodic frames, and, more particular, fixed-length frames.

In SONET, a source network node sends a frame across a network link to a destination network node. In a SONET hierarchy, comprising a plurality of synchronous transport signal (STS) levels, each frame has rows and columns. For example, an STS-1 electrical level corresponding to optical carrier (OC) level 1 (OC-1) has a frame having 9 rows and 90 columns. For purposes of clarity, the remainder of this specification will tend to be disclosed in terms of an STS-1 frame. However, it will be apparent to those of skill in the art that this specification equally applies to STS-N levels, for N an integer conforming SONET standards.

STS-1 frames are transmitted at a rate of 8,000 frames per second, resulting in a data rate of 51.84 megabits-per-second (Mbps). Notably, frames may be concatenated to provide an envelope capable of a data rate in excess of 51.84 Mbps. Each frame comprises an envelope portion and an overhead portion. With respect to the overhead portion, each STS-1 frame transports Section Overhead (SOH) and Line Overhead (LOH) in the first three columns of a frame. SOH and LOH in combination are referred to as Transport Overhead (TOH). Another form of overhead in a frame is contained in an information payload area. This overhead is called Path Overhead (POH). POH is processed at SONET path terminating equipment as it travels as part of a Synchronous Payload Envelope (SPE). Thus, SPE comprises both user data and overhead, namely, POH. Section and line overhead is terminated at section and line terminating equipment.

Accordingly, it should be appreciated that a significant amount of channel space or, more particularly, informational space within a frame, is consumed by overhead. Furthermore, it should be understood that whether a channelized or non-channelized ("unchannelized") approach to transporting multiple STS-1 frames is used, overhead increases linearly with respect to N, a number of STS-1 frame equivalents. For example, in a channelized architecture, such as STS-3, which illustratively may be thought of as three STS-1 frames stacked up upon one another, three STS-1 frames are processed per second as opposed to processing one STS-1 frame per second. In an unchannelized architecture, such as a super payload, STS-1 frames are concatenated to form STS-3c frames. In either architecture, processing overhead is substantial.

Heretofore, individual blocks of logic were used to support each function for each element of overhead. Massive parallelism for processing each byte was used for immediacy. Such conventional configurations used flip-flops for storing information for such processing. Thus, it should be understood that integrated circuits configured to implement individual logic blocks for processing each overhead element or byte type result in a significant number of transistors or gates. Accordingly, integrated circuits or microchips constructed with such individual blocks of logic consumed significant amounts of area on a semiconductor wafer ("semiconductor wafer real estate"). Moreover, more gates translate into more power consumption.

Accordingly, it would be desirable to provide a device for processing overhead that consumes less semiconductor wafer area and less power.

SUMMARY OF THE INVENTION

By recognizing that every byte type in a frame did not require processing immediacy and that some activities, especially performance monitoring activities, did not require processing immediacy, frame latency was introduced. Accordingly, with frame latency, a memory technology apart from flip-flops could be used. Such memory technology, though having longer access times than flip-flops, would have advantages of consuming less power and semiconductor wafer area than equivalent flip-flop memory capacities. Moreover, by allowing for frame latency, parallelism associated with individual logic blocks could be replaced in part with an overhead processor in accordance with the present invention. By using sequential instructions for processing overhead, such an overhead processor could be used and would comparatively use less semiconductor wafer area than prior art individual logic blocks.

An aspect of the present invention is a system for processing overhead information in a network. More particularly, an overhead processor comprising an address generator, memory and control logic, and is in communication with a transmit and receive module.

Another aspect of the present invention is a method for identifying overhead to be processed. More particularly an overhead processing system is provided and programmed. Values are initialized for the overhead processing system, and an event queue of the overhead processing system is checked for an event. If there is an event in the event queue, type of the event is determined. If the event type is for selected rows of overhead, information for the selected rows of overhead is processed.

Another aspect of the present invention is an add side for a transmit module. Another aspect of the present invention is a drop side for a receive module.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
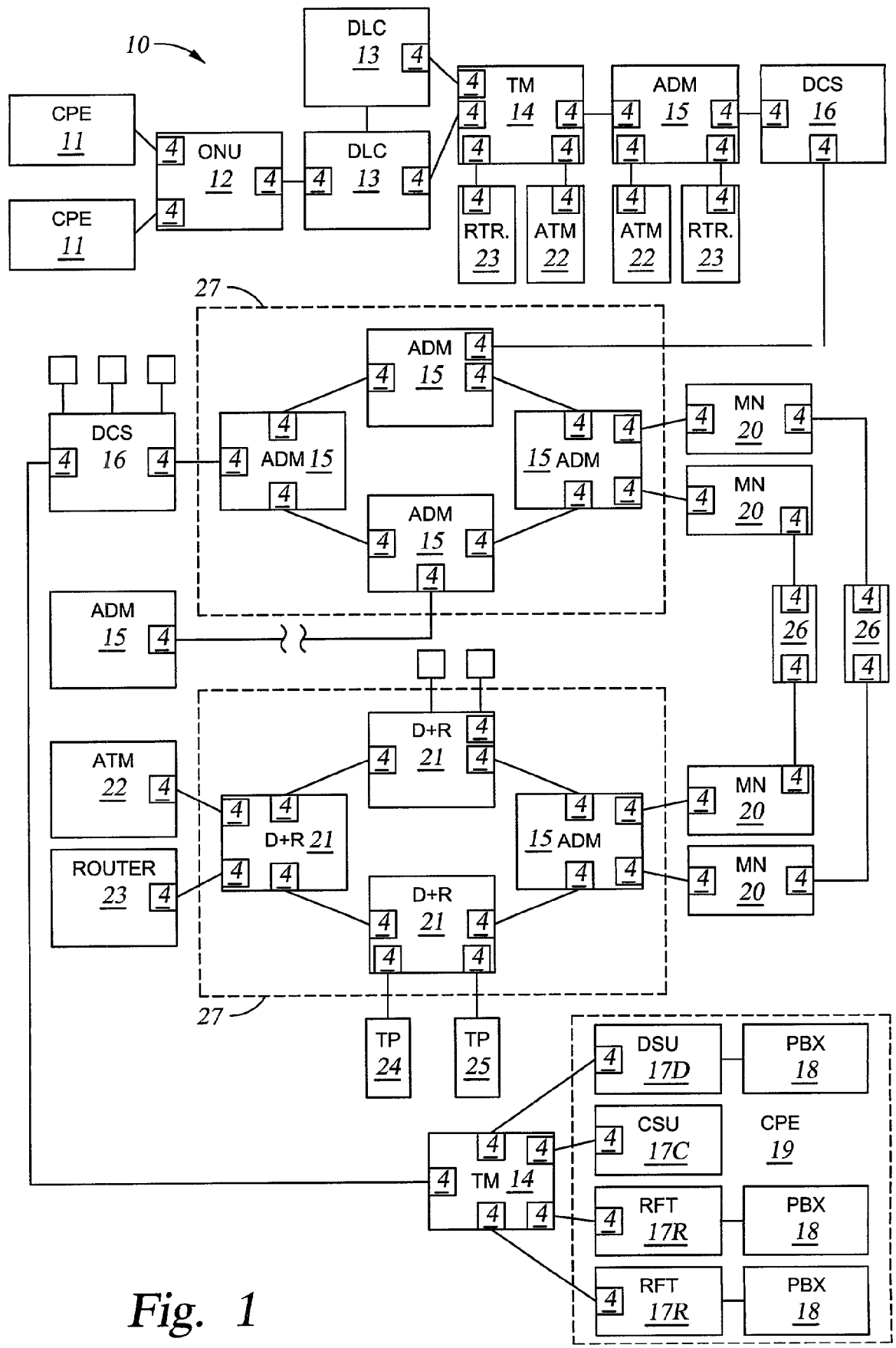
FIG. 1 is a block diagram depicting an exemplary portion of a network having network elements configured with overhead processor system(s) in accordance with an aspect of the present invention.

Referring to FIG. 1, there is shown a block diagram depicting an exemplary portion of a network 10 having network elements configured with overhead processor system 4 in accordance with an aspect of the present invention. Customer premises equipment (CPE) 11 is coupled to optical network unit (ONU) 12. ONU is used to convert SONET optical fiber signals to electrical signals, such as for transmission over copper wire. ONU 12 may comprise overhead processor systems 4. CPE 19 comprises PBX 18 and remote fiber terminals (RFTs) 17R, digital subscription unit (DSU) 17D and channel service unit (CSU) 17C. Accordingly, CPE 19 may be for a business use, and CPE 11 may be for residential use.

RFTs 17R are sometimes referred to as digital loop carriers (DLCS) 13. DLCs 13 and RFTs 17R may comprise overhead processor systems 4. DLCs 13 and RFTs 17R are coupled to terminal multiplexers (TMs) 14. TMs 14 may comprise overhead processor systems 4. TM 14 may be coupled to a router 23 and an asynchronous transfer mode (ATM) switch 22, as payload area of a frame may comprise Internet Protocol (IP) packets or ATM cells. TM 14 may be coupled to add/drop multiplexer (ADM) 15. ADM 15 may be coupled to a switch 22 or a router 23. ADMs 15, routers 23 and switches 22 may comprise overhead processor systems 4. ADMs 15 may be coupled to digital cross-connect systems (DCSs) 16. DCSs 16 may comprise overhead processor systems 4. ADM 15 may be coupled to drop-and-repeat nodes (D+Rs) 24. D+Rs 21 may comprise overhead processor systems 4. ADMs 15 may be coupled to ADMs 15 via signal regenerators 26 and matched nodes 20, which regenerators 26 and matched nodes 20 may have overhead processor systems 4. Moreover, ring architectures 27 may be formed using D+Rs 21 and ADMs 15.

It should be understood that network elements as illustratively shown in network 10 may be linked together by a variety of transmission types. For purposes of illustration, transmission payloads 24 and 25 to D+R 21 may be different. Accordingly, network 10 may use any of a variety of transmission payload types, including but not limited to DS-1, E-1, DS-1c, DS-2, E-3, DS-3, FDDI, DS-4na, DQDB, ATM cells, IP packets, among others. More particularly, it should be appreciated that an aspect of the present invention involves processing protocols other than SONET and SDH, including but not limited to multimedia protocols such as Moving Picture Experts Group (MPEG) and MPEG-like streams.

In view of network 10, it should be appreciated that overhead processor systems 4 may be used for terminating, monitoring or generating overhead information. Furthermore, overhead processor systems 4 may be used for applications supporting one or more protocols including one or more transmission payload types. Overhead processor system 4 may be used for connectivity, whether such connectivity is for any terminating, monitoring or generating of overhead or any combination thereof. More particularly, overhead processor system 4 may be used for any or any combination of POH, LOH or SOH terminating, monitoring or generating.

Figure 2:
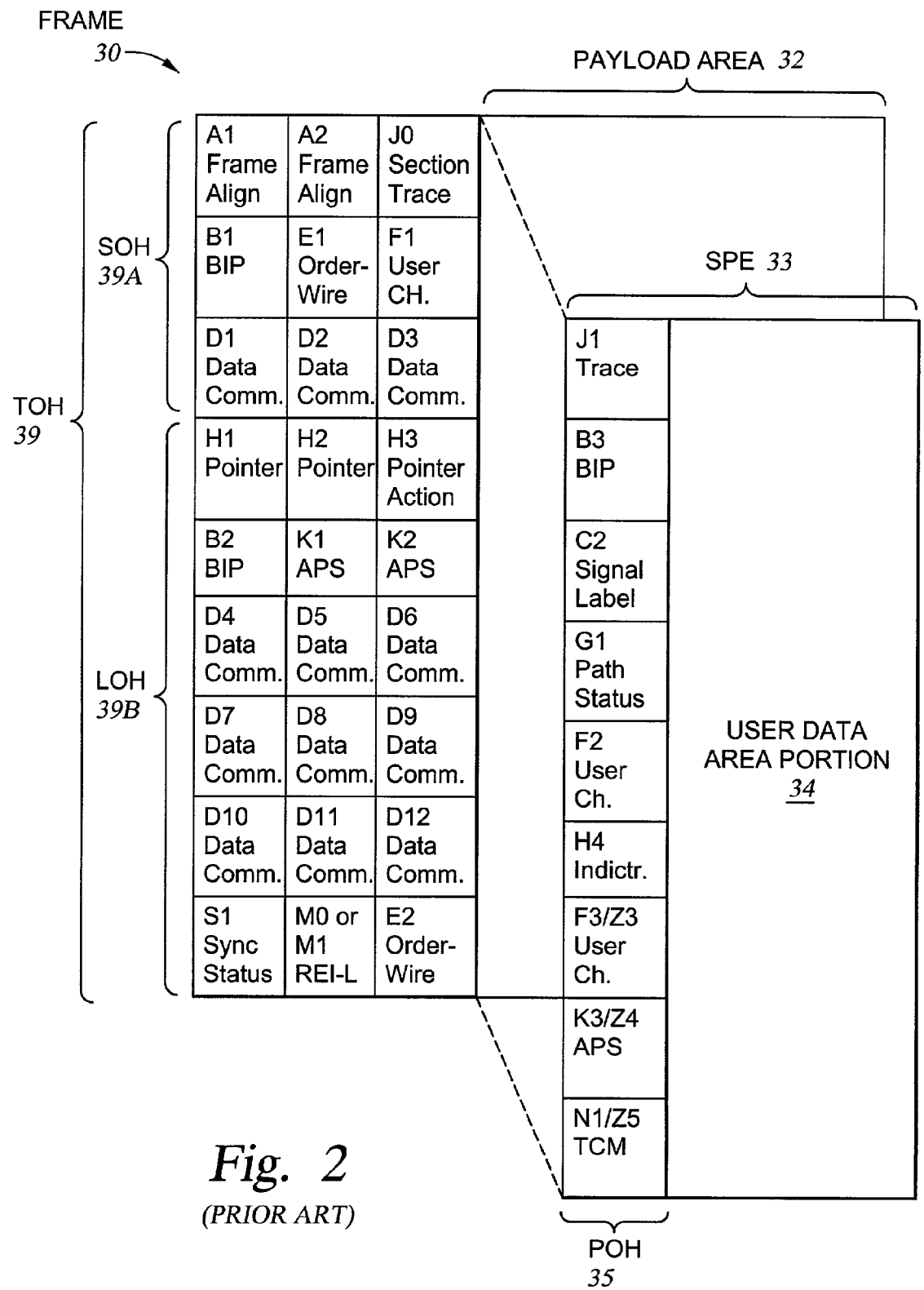
FIG. 2 is a block diagram depicting an exemplary portion of a SONET STS-1 frame of the prior art.

Referring to FIG. 2, there is shown a block diagram depicting an exemplary portion of a SONET STS-1 frame 30 of the prior art. As is known, a SONET STS-1 frame 30 forms a matrix of 9 rows by 90 columns wherein each cell within such a matrix is one byte. As mentioned above, frame 30 comprises POH 35, SOH 39A, and LOH 39B. SOH 39A is sometimes referred to as a "regenerator section" (RSOH) in SDH terminology, and LOH 39B is sometimes referred to as a "multiplex section" (MSOH) in SDH terminology. Moreover, "SOH" in SDH terms is equivalent to "TOH" in SONET terms. Accordingly, to avoid confusion, TOH 39 shall be used to refer to both a regenerator section and a multiplex section of a frame.

POH 35 is located in payload area 32 and forms a portion of SPE 33. SPE 33 comprises POH 35 and user data 34. As illustratively shown, TOH 39 and POH 35 comprise overhead information used by SONET configured equipment along a network path.

TOH 39 comprises well-known overhead byte fields. Notably, J0 is defined only in the first STS-1 frame from a device or node, as all frames associated with a concatenation must come from the same device. In other STS-1s in an STS-N, J0 is used for growth (Z0). Moreover, it should be understood that byte fields in TOH 39 may be undefined, as is well known. Moreover, byte fields in TOH 39 may be used for growth, namely, S1 and M0 or M1, instead of as indicated in FIG. 2, as is well known. Because frame 30 is well known, other details regarding frame 30 have been omitted for purposes of clarity.

Figure 3:
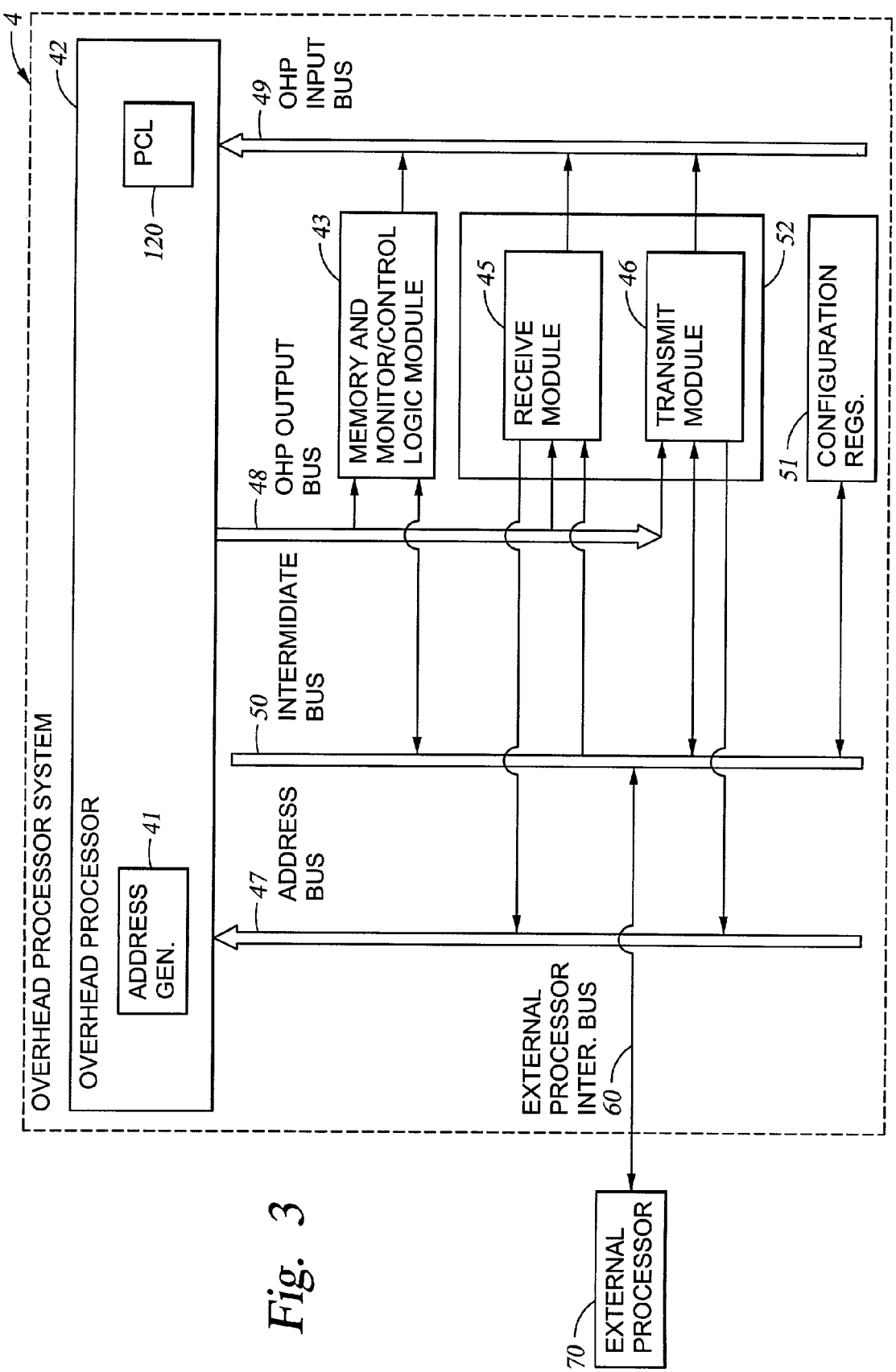
FIG. 3 is a block diagram depicting an exemplary portion of an embodiment of an overhead processor system in accordance with an aspect of the present invention.

Referring to FIG. 3, there is shown a block diagram depicting an exemplary portion of overhead processor system 4 in accordance with an aspect of the present invention. System 4 comprises overhead processor 42, memory and control logic module 43, and receive/transmit module 52. Receive/transmit module 52 provides information to address generator 41 of overhead processor 42 using in part address bus 47. Memory and control logic module 43 and receive/ transmit module 52 are coupled to overhead processor 42 through overhead processor output bus 48 and overhead processor input bus 49. Address generator 41 provides addresses within overhead processor 42 in part based upon received scheduled event signals. Thus, an appropriate address or vector is provided to overhead processor 42 corresponding to a timed event. Receive/transmit module 52 may comprise separate receive subsubmodule 45 and transmit subsubmodule 46 portions. Configuration registers 51 may be coupled to intermediate bus 50 for providing stored configuration information.

It should be appreciated that overhead processor system 4 is separate from external processor 70. External processor 70 is coupled to intermediate bus 50 via external processor interface bus 60. Intermediate bus 50 is used in part for communication to and from memory and control logic 43, receive submodule 45, and transmit submodule 46. External processor 70 is conventionally a microprocessor, and as it is a well-known conventional element, external processor 70 will not be disclosed in unnecessary detail in this specification.

Overhead processor 42 may be implemented with a general-purpose processor executing firmware, such as a microprocessor or a microcode engine, as described below. Using an overhead processor 42, overhead data is stored in memory, as described below in more detail, for processing.

A frame-based latency is introduced with this architecture. By frame-based latency, it is meant to include latency of a frame or a portion of a frame. Though the present invention is described in terms of frame-based latency, it will be apparent to those of skill in the art that packet-based latency may be used. However, for purposes of clarity, the present invention is described in terms of frame-based latency though either latency may be used. It should be understood that certain bytes in a frame need processing for a plurality of bytes within a frame to comply with SONET or SDH standards, as opposed to processing once per frame. Moreover, it should be understood that some bytes need substantially immediate processing to comply with SONET or SDH standards. However, it should further be understood that some bytes, especially with respect to performance monitoring activity, may be processed within a frame-based latency window.

Figure 4:
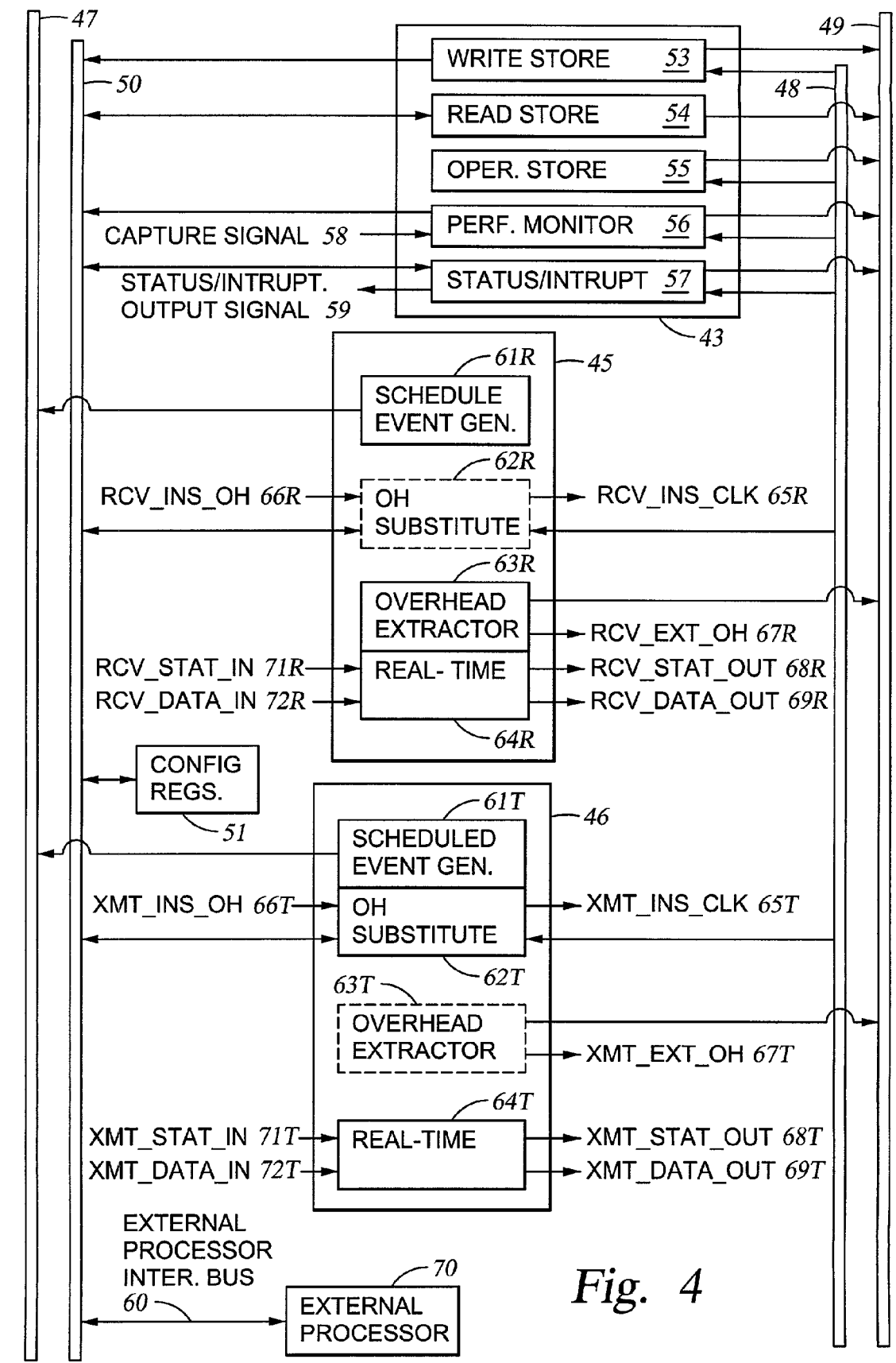
FIG. 4 is a block diagram depicting a portion of an embodiment of an overhead processor system coupled to an external processor in accordance with an aspect of the present invention.

Referring to FIG. 4, there is shown a block diagram depicting a portion of overhead processor system 4 of FIG. 3 coupled to external processor 70 in accordance with an aspect of the present invention. With continuing reference to FIG. 4 and renewed reference to FIG. 3, overhead processor system 4 comprises receive/transmit module 52. Module 52 is described herein as having a receive submodule 45 and a transmit submodule 46. However, it will be apparent that submodules 45 and 46 have similar blocks. For purposes of clarity of explanation, a separate receive submodule 45 and transmit submodule 46 are shown and described to delineate description of respective receive and transmit functions and signals. Moreover, it should be understood that receive submodule 45 and transmit submodule 46 comprise portions of overhead processor system 4 that may be deployed in a network having duplex capability, more particularly, full duplex capability. Thus, network nodes may send and receive information, including overhead information, at a same time.

Receive submodule 45 comprises scheduled event generator 61R, overhead extractor 63R, and real time logic 64R. Optionally, an overhead substitute 62R may be included with receive submodule 45, which will be apparent in view of this disclosure. Receive submodule 45 is configured to receive in part signals 66R, 71R and 72R and provide in part signals 65R, 67R, 68R, and 69R. Receive status input (RCV_STAT_IN) signal 71R and receive status output (RCV_STAT_OUT) signal 68R comprises status information which is provided to or from, respectively, receive submodule 45 of overhead processor system 4. Such status information may be used in part to generate overhead information, though such status information is primarily used for performance monitoring such as alarm conditions or other defect notifications.

Receive data input (RCV_DATA_IN) signal 72R and receive data output (RCV_DATA_OUT) signal 69R comprise a data stream to or from, respectively, receive submodule 45. Receive extracted overhead (RCV_EXT_OH) signal 67R provides a separate path for processing overhead extracted from signal 72R. Receive insert data (RCV_INS_DATA) signal 66R allows a user to insert or substitute overhead data. Substituted overhead data may override overhead data generated using system 4. For purposes of clarity, substituted overhead shall mean overhead inserted into a byte field whether or not any data was over-written in said byte field. Receive insert clock (RCV_INS_CLK) signal 65R provides a ready signal for enabling receipt of overhead data on signal 66R to receive submodule 45. Continuing the example, signal 72R is a SONET data stream and thus received from a source external to a network node containing such a receive submodule 45.

Transmit submodule 46 comprises scheduled event generator 61T, overhead substitute 62T, and real time logic 64T. Optionally, overhead extractor 63T may be included in transmit submodule 46, which will become apparent in view of this disclosure. Transmit (XMT) submodule 46 is configured to receive in part signals 66T, 71T and 72T and provide in part signals 65T, 67T, 68T, and 69T. Continuing the example, signal 69T would be transmitted as a SONET stream external to such a network node containing such a transmit submodule 46.

Receive submodule 45 functionally is used for processing received network traffic for subsequent retransmission to another network node or for termination at this node comprising such a receive submodule 45, whereas transmit submodule 46 functionally is for processing node originating network traffic for transmission to another network node, respectively. Though, signal 72T may comprise user-inserted overhead, it will be apparent to one of skill in the art in view of this detailed description that signal 72R is more likely to have overhead to be extracted than signal 72T. Furthermore, it will be apparent to one of skill in the art in view of this detailed description that signal 69T is more likely to have substituted overhead than signal 69R. Accordingly, for purposes of clarity, submodules 45 and 46 are described according to their main functions, though other functions are applicable as mentioned elsewhere herein.

Memory and control logic 43 comprises write store 53, read store 54, operational or working store 55, performance monitor 56, and status/interrupt logic 57. Write store 53, read store 54, operational store 55, and a portion of performance monitor 56 comprise memory. Memory may comprise an array of flash memory cells, electrically-erasable-programmable-read-only memory (EEPROM) cells, random access memory (RAM) cells, latches, flip-flops, and like known circuits for configured for storing information. However, as mentioned above, RAM consumes less power and wafer area than flip-flops of equal memory capacity. More particularly, a dual port RAM or a multi-port RAM having separate write and read ports may be used. Memory and control logic module 43 receives in part capture signal 58 and provides in part status/interrupt output signals 59, described in more detail below.

With respect to interrupt generator 57, interrupts are done in "real-time," namely, an interrupt is set upon detection. Similarly when external processor 70 disables an interrupt, such interrupt is immediately cleared to avoid system conflicts.

Capture signal 58 enabling extraction of performance data stored in performance monitor 56. Such performance data is extracted at regular time intervals, for example once per second, and thus signal 58 would be activated once per second in this example. In this manner, a snapshot of performance data may be provided or obtained. Moreover, it should be understood that using RAM to store such performance data facilitates reduced power and wafer area consumption.

Figure 5:
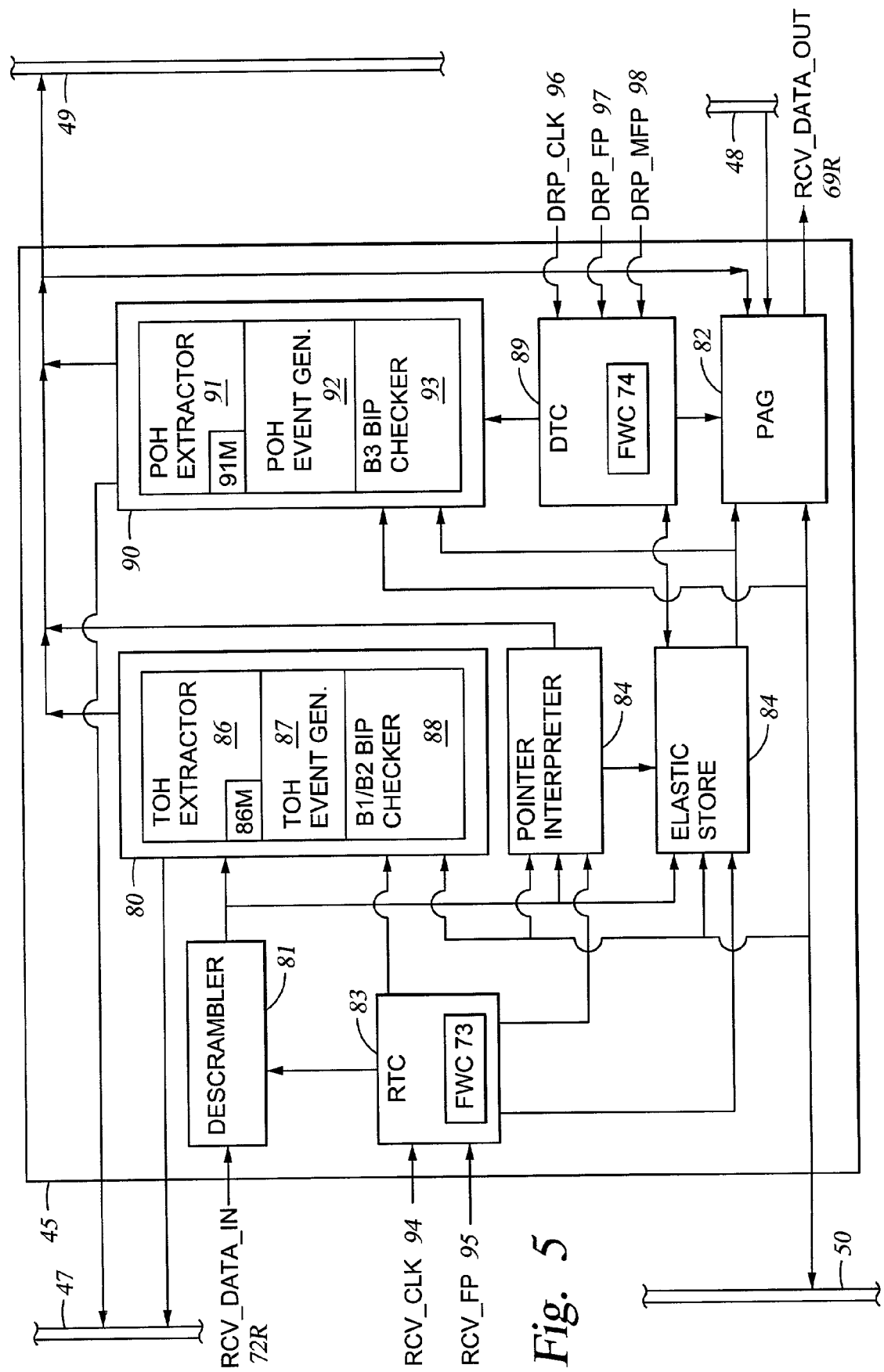
FIG. 5 is a block diagram of an exemplary portion of an embodiment of a receive side of a receive submodule in accordance with an aspect of the present invention.

Referring to FIG. 5, there is shown a block diagram of an exemplary portion of a receive side of submodule 45 in accordance with an aspect of the present invention. With continuing reference to FIG. 5 and renewed reference to FIGS. 2, 3 and 4, such a receive side of submodule 45 is described. Receive data in signal (RCV_DATA_IN) 72 is provided to descrambler 81. Receive clock (RCV_CLK) signal 94 and receive frame pulse (RCV_FP) signal 95 are provided to receive timing control (RTC) 83. Receive timing control 83 generates timing signals for descrambler 81, extractor 86 of receive submodule 80, pointer interpreter 84, and a first portion of elastic store 85. Receive timing control 83 is synchronized by incoming receive framing pulses of signal 95. Receive timing control 83 comprises flywheel counter 73 to avoid having to receive continuous framing pulses for maintaining synchronization. Signal 95 is generated by upstream logic in a well-known manner, and may be associated with a serial bitstream or parallel streams of data. Conventionally, logic is configured to check for a correct framing pattern, and locks on to such a pattern to provide an indicator, such as signal 95, when a correct pattern is found.

Descrambler 81 receives signal 72R corresponding to an incoming stream of frame information, including TOH 39, POH 35, and user data 34, if any. Signal 72R is exclusively logically OR'd (XOR) with a frame synchronous polynomial in a well-known manner. Notably, A1, A2 and J0/Z0 are not included in such an XOR operation, though such bytes are provided to overhead processor 42. Output from descrambler 81, resulting from processing signal 72R with a frame synchronous polynomial, is provided to receive submodule 80, pointer interpreter 84 and elastic store 85, which use such descrambled verions of signal 72R to obtain overhead therefrom. Notably, receive submodule 45 may be configured such that elastic store 85 stores only SPE 33, and may be partitioned to have a first and second portions or sections such that one SPE is in one section and another SPE is in another section.

Receive submodule 80 provides a receive side interface to overhead processor 4. Receive timing control 83 provides timing signals facilitating identification of incoming overhead bytes of TOH 39. Receive submodule 80 stores such incoming TOH bytes in memory, such as operational store 55 or separate memory 86M of extractor 86. RAM, and more particularly, multiported RAM, may be used to implement such memory 55 or 86M to provide an interface to overhead processor 42 and an interface to output captured overhead bytes. Scheduled event generator 87 provides a signal to overhead processor 42 to inform it that certain TOH bytes have been received and are ready to be processed.

Scheduled events may be provided at various locations with respect to a frame 30. For example scheduled events may be provided every third row of the nine row overhead section of each STS-N, namely, selecting scheduled events to occur after reception of D3, D6 and E2 bytes of an incoming SONET stream. However, locations, other than these exemplary locations may be used. For example, a scheduled event may be set to occur for each row as it is received, and thus storage for a minimum of overhead in two rows could be implemented, namely, storage for an overhead row being received and storage for a previously received overhead row being processed. Similarly, scheduled events may be set to occur for each frame as it is received, and thus storage for a minimum of two frames worth of overhead could be implemented, namely, storage for overhead of a frame being received and storage for overhead of a previously received frame being processed. In an embodiment described herein, though scheduled events are set for every three rows, storage for a frame is described such that each overhead byte has a dedicated location in read store 54.

Bit interleaved parity (BIP) checker 88 generates expected values for bytes B1 and B2. Notably, B1 and B2 are processed on each byte, and thus for speed reasons, logic is provided for processing B1 and B2 for each byte; however, accumulation of errors for B1 and B2 may be stored in memory and updated once per frame. Overhead processor 42 compares such expected values to extracted B1 and B2 values. Such BIP values are extracted by extractor 86 when processing a SONET stream. An XOR logic function, whether done in hardware or firmware, may be used for this comparison.

Receive timing control 83 provides indicators, such as enable signals, to pointer interpreter 84 indicating that H1 and H2 bytes are being received. Functionality of pointer interpreter 84 is well known, and thus will not be explained in unnecessary detail. While overhead processor 42 may be used to implement non-time critical pointer interpretation functions, H1 and H2 are time-critical. Accordingly, pointer interpreter 84 may be completely implemented in hardware facilitating time critical performance for processing time critical bytes, status signals, such as loss of pointer (LOP), among other well-known status signals. Such status signals may be made available to overhead processor 42. Status signals may be provided from interpreter 84 to overhead processor 42 and to pointer/AIS generator (PAG) 82 for performance monitoring of pointer movements or for generation of an alarm indication signal (AIS). In addition to providing status signals, pointer interpreter 84 indicates a location of a J1 byte of each incoming SONET stream, and more particularly, pointer interpreter 84 indicates which bytes of such an incoming stream are payload for providing to elastic store 85.

Elastic store 85 may be implemented as a first-in, first-out (FIFO) buffer in an integrated FIFO fill level. Elastic store 85 is used to store SPE 33. Interpreter 84 in association with receive timing control 83 indicates which bytes are to be written to elastic store 85, as such bytes may be clocked into elastic store 85 responsive to signal 94. Association between bytes and synchronous timing is well-known for applications such as SONET and SDH.

Data is clocked out of elastic store 85 responsive to drop clock (DRP_CLK) signal 96. Drop timing control (DTC) 89 provides an enable signal for reading data out of elastic store 85. Drop timing control 89 may be synchronized to backplane clock signal 96 using drop frame pulse (DRP_FP) signal 97 and drop multi-frame pulse (DRP_MFP) signal 98, namely, frame alignment signals. Drop timing control 89 uses flywheel counter 74 to avoid having continuous signal 96 and signal 97 indicators or pulses. Depending on FIFO fill levels of elastic store 85 and user configurable parameters programmable through use of an external microprocessor interface bus 60 via bus 50, drop timing control 89 may be configured to cause pointer generator 82 to force a pointer increment or decrement to avoid a FIFO overrun or underrun condition. A pointer increment causes no data to be read out of elastic store 85 for the byte immediately following H3 for one frame. A pointer decrement replaces an H3 byte with data for one frame. Both increment and decrement operations are in accordance with SONET and SDH standards.

Bus 50 may be coupled to submodule 80, pointer interpreter 84, elastic store 85, and pointer/AIS generator 82 to facilitate configuration, but not operation, of overhead processor system 4. In other words, external processor 70 may be used to configure overhead processor system 4, and more particularly, such configuring may be done during operation of overhead processor system 4. Moreover, external processor 70 may be used to read status and performance monitoring registers 56.

Drop timing control 89 generates a signal to disable reading of data from elastic store 85 when TOH 39 is generated. This disable signal may also be implemented for handling special conditions, as defined by SDH and SONET standards, during pointer increment or decrement operations. Drop timing control 89 generates timing signals for submodule 90.

Submodule 90 provides a receive side interface to overhead processor 42 for POH 35. Submodule 90 may store such overhead data in memory, such as operational store 55 or memory 91 M. RAM, and more particularly, multiported RAM, may be used to implement operational store 55 or memory 91 M, as described above. POH data is extracted by POH extractor 91 from SPE 33 provided from elastic store 85. Drop timing control 89 provides timing signals for identification of POH bytes read from elastic store 85. Notably, extraction of POH 35 is done after retiming of elastic store 85 by drop timing control 89; however, POH may be extracted before such retiming. In other words, POH may be extracted from user data off of timing of receive timing control 83 by placing a POH extractor 91 in front of elastic store 85.

POH scheduled event generator 92 provides a signal to overhead processor 42 to inform it that POH bytes have been received and are ready to be processed. Again, scheduled events may be placed at any of a variety of locations. However, continuing the above example of scheduled events at every third row, scheduled events would occur after reception of POH C2, H4 and N1 bytes of each STS-N payload frame.

BIP checker 93 generates an expected B3 value. Overhead processor 42 compares extracted B3 from POH 35 stored in memory and generated B3 values to check for error. As mentioned above, this is an XOR process that may be implemented in hardware or firmware.

Pointer/AIS generator 82 is configured to format information provided to drop side bus or overhead processor input bus 49. Pointer generator portion of generator 82 checks offset of a J1 indicator as read from elastic store 85 and checks an H3 byte as obtained from submodule 80. Such an offset value is loaded into H1 and H2 byte fields on a next frame. Drop timing control 89 provides a signal to generator 82 to indicate that a pointer increment or decrement is to be made. For example, existing pointers in H1 and H2 may be inverted in accordance with SONET standards. Generator 82 is configured to check that J1 does not change location except for movement owing to a pointer increment or decrement. If a change in location is detected, a new pointer value, which is not an increment or decrement to SPE position within a frame, is written with a new data flag (NDF) enabled in accordance with SONET and SDH standards. Optionally, generator 92 may frame up to an H4 tributary multi-frame. In which implementation, a sequential H4 a two-bit pattern should be regenerated.

An AIS portion of generator 82 is configured to assert one of several AIS's downstream. A decision to assert an AIS may be made by overhead processor 42 in response to processing of overhead data and interpretation of hardware status bits, for example, loss of signal (LOS), loss of pointer (LOP), elastic store errors, and the like.

Figure 6:
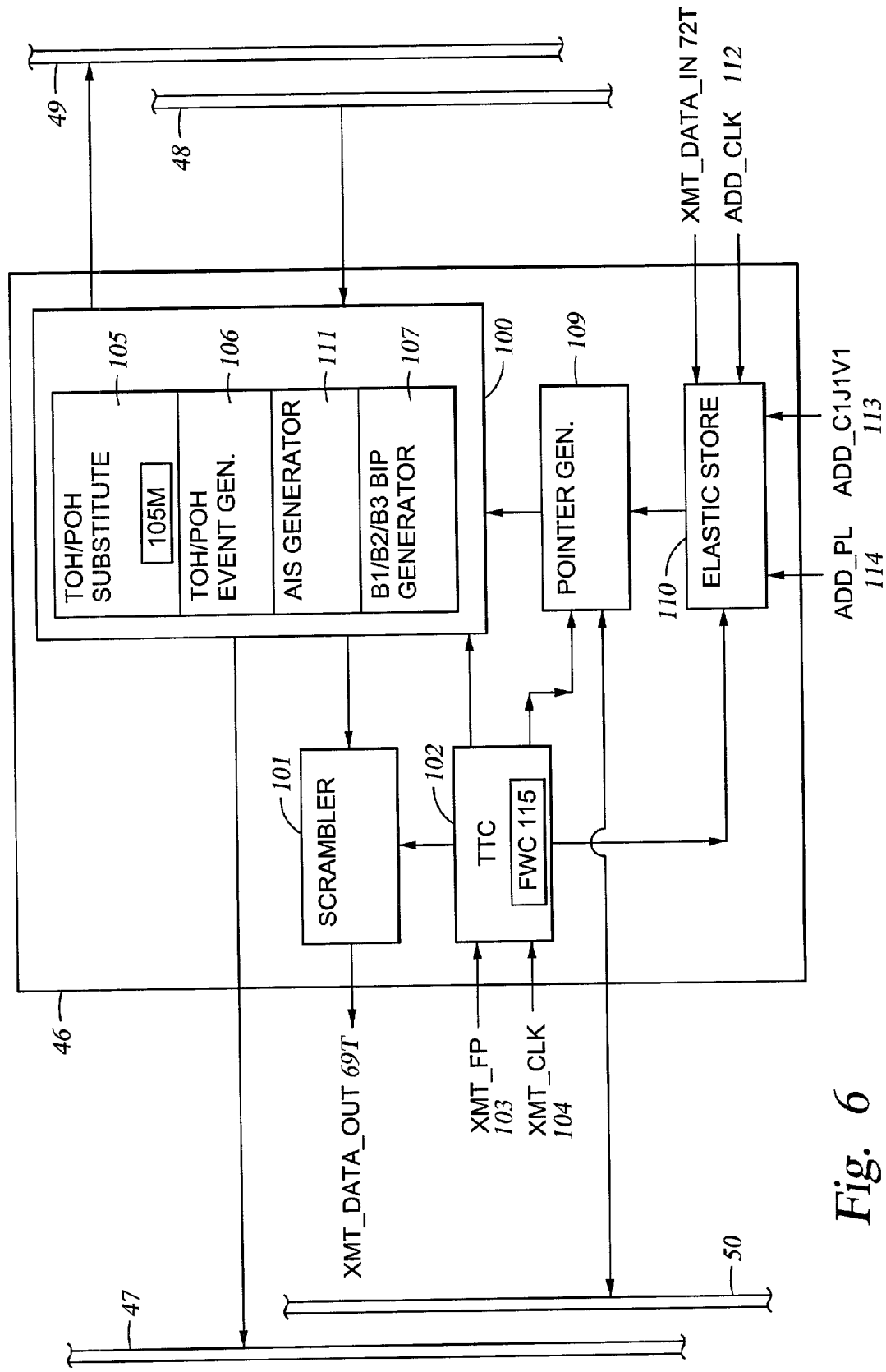
FIG. 6 is a block diagram of an exemplary portion of an embodiment of a transmit side of a transmit submodule in accordance with an aspect of the present invention.

With continuing reference to FIGS. 2–5 and additional reference to FIG. 6, where there is shown a block diagram of an exemplary portion of an add side of submodule 46 in accordance with an aspect of the present invention, such add side is described. Transmit timing control (TTC) 102 is synchronized with use of transmit frame pulse (XMT_FP) signal 103, namely, a frame alignment signal. Transmit timing control 102 comprises a flywheel counter 115 to avoid having to have continuous frame pulses from signal 103 as indicators for synchronization.

Elastic store 110 is like elastic store 85 and may be implemented as a FIFO buffer with an integrated fill level. SPE 33 is written into elastic store 110. ADD_PL signal 114 indicates which bytes are to be written into elastic store 110. ADD_PL signal 114 and ADD_C1J1V1 signal 113 are well-known backplane signals. User data 34 and POH 35 is provided on 72T, and ADD_CLK signal 112 is used for clocking in such data to elastic store 110. Data is clocked out of elastic store 110 in response to an enable signal from transmit timing control 102. Transmit timing control 102 provides timing signals for scrambler 101, submodule 100 and pointer generator 109. As mentioned above, POH 35 may be separated out prior to storage in elastic store 110 by locating a separate POH extractor 91 in front of elastic store 110.

Pointer generator 109 operates as the above-described pointer generator portion of generator 82. Pointer generator 109 may be used to increment or decrement a pointer as described above, except transmit timing control 102, and not drop timing control 89, is used to cause such pointer adjustment.

Submodule 100 is configured for inserting generated overhead bytes of data for an output stream, generating AIS if requested, and calculating and inserting BIP bytes. Submodule 100 comprises TOH/POH substitute 105, TOH/POH event generator 106, AIS generator 111 and B1/B2/B3 BIP generator 107.

TOH/POH substitute 105 is used to substitute overhead data into a frame. Such bytes of overhead are generated by overhead processor 42, and substitute 105 places bytes in appropriate locations for an outgoing stream. Notably, not all byte types need generation on each frame and not all byte types need to be generated by overhead processor 42. J0/K1/K2/M1/J1/G1/N1 would generally be byte types generated by overhead processor 42 each frame. Optionally, data communication channels D1–D3 and D4–D12 may be sourced via an external serial stream implemented in hardware (not shown) in accordance with conventional practice. Optionally or in addition to such conventional practice, data communication channels D1–D12, along with orderwire channels E1 and E2, may be sourced in parallel and provided as external overhead signal 66T. F1/S1/C2/F2/F3/K3 may be sourced from external processor 70. External processor 70 may write information associated with F1/S1/C2/F2/F3/K3 into write store 53, or more particularly overhead processor control memory 123 described in more detail below with reference to FIG. 7. Overhead processor 42 may then transfer F1/S1/C2/F2/F3/K3 bytes to substitute 105 each frame or overhead processor may write F1/S1/C2/F2/F3/K3 bytes to dedicated memory 105M of substitute 105. Memory 105M may be RAM, reprogrammable ROM, flip-flops, latches and the like. However, using a dedicated RAM 105M implementation will reduce semiconductor wafer area demands and reduce power consumption.

AIS generation is generally asserted by AIS generator 111 when requested by external processor 70. However, AIS generation may be automatic as a consequence of events such as FIFO overrun or underrun condition. As is known, AIS generation comprises an AIS-L (MS-AIS) mode, an AIS-P (AU-AIS) mode and a AIS-V (similar to TU-AIS) mode in accordance with SONET (SDH) standards.

TOH/POH scheduled event generator 106 provides a signal to overhead processor 42 to indicate that overhead bytes have been transmitted and need to be generated for a next frame 30. Continuing the above example of scheduled events every third row of overhead for each STS-N, scheduled events would occur after transmission of C2, H4 and N1 bytes of each payload frame.

BIP generator 107 generates B1, B2 and B3 values. TOH/POH substitute 105 places such B1, B2 and B3 values into appropriate byte fields on an outgoing data stream. Owing to XORing each byte in a stream with respect to B1, BIP generation may be implemented in hardware. BIP corruption for diagnostic purposes may be done with frame latency as mentioned above.

Scrambler 101 XORs an outgoing stream with a frame synchronous polynomial, except for byte fields A1, A2 and J0/Z0, in accordance with SONET and SDH standards. That which results from this XORing is provided as signal 69T, for example SONET or SDH configured bit streams. Data from elastic store 110 is coupled through pointer generator 109 and submodule 100 to scrambler 101 for providing signal 69T, which is clocked out using timing transmit control 102 in partial response to transmit clock (XMT_CLK) signal 104.

Figure 7:
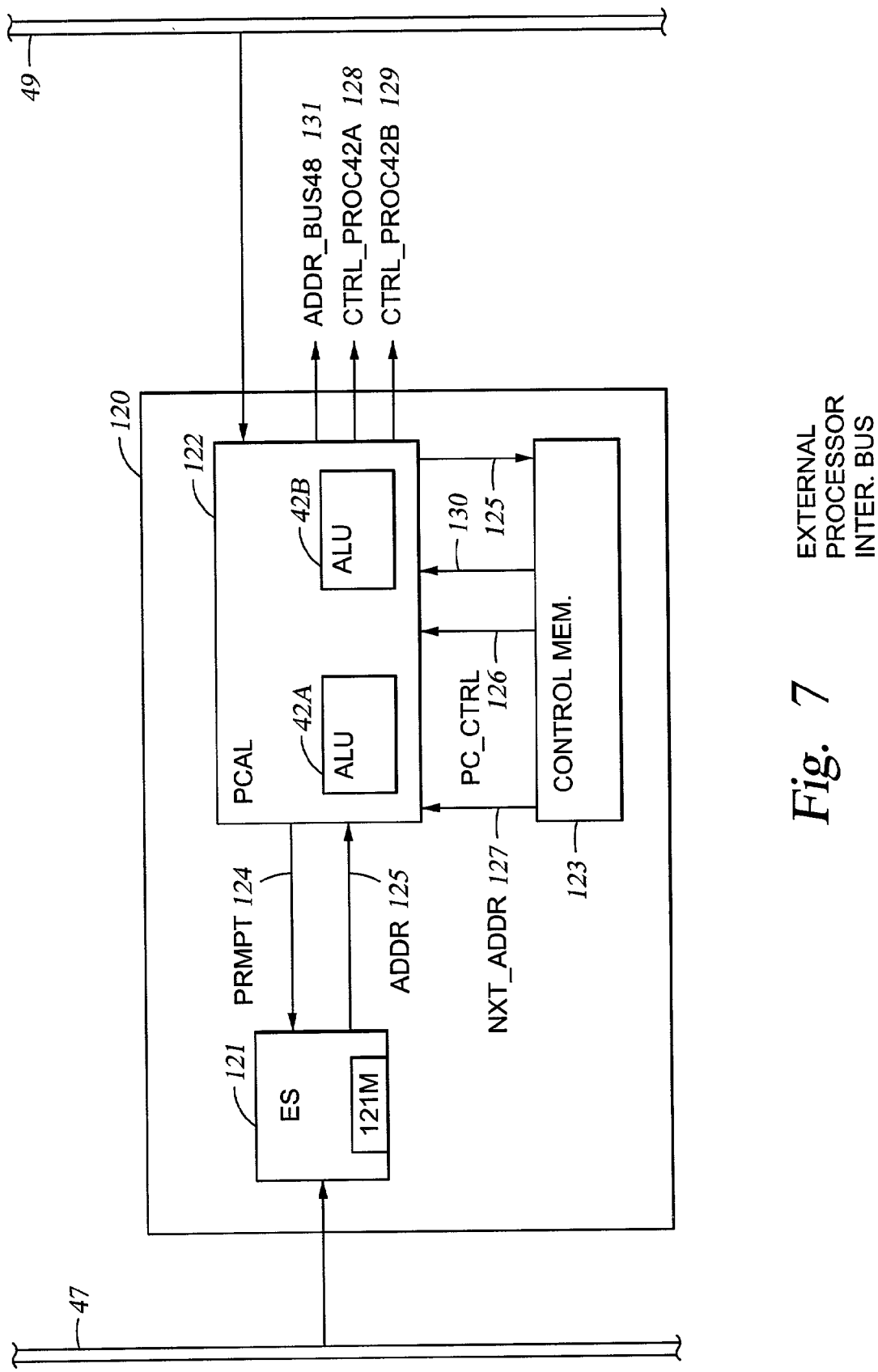
FIG. 7 is a block diagram of an exemplary portion of an embodiment of processor control logic (PCL) in accordance with an aspect of the present invention.

Referring to FIG. 7, there is shown a block diagram of an exemplary portion of processor control logic (PCL) 120 in accordance with an aspect of the present invention. PCL 120 may form a portion of overhead processor 42 as shown in FIG. 3. PCL 120 comprises event scheduler (ES) 121, program counter and logic (PCAL) 122 and control memory 123. PCAL 122 is a conditionally loadable counter or sequencer that may comprise one or more arithmetic logic units (ALUs). By way of example, PCAL 122 is illustratively shown comprising two ALUs 42A and 42B though fewer or more ALUs may be used. When overhead processor 42 is in an idle state, namely, no instructions are executing, PCAL 122 prompts, via prompt signal 124, ES 121 and waits for ES 121 to provide a vector address 125. When PCAL 122 receives such an address 125, an idle state is exited as a scheduled event is being serviced.

Under firmware instructions in a form of PCAL control (PC_CTRL) signal 126, which firmware instructions may be stored in control memory 123 such as disk, RAM, flash, ROM or the like, a next address (NXT_ADDR) signal 127 provided by control memory 123 is either an increment of a current address or a new address on address signal125 provided from PCAL 122 to control memory 123. Addressing signal 130 indicates what to put on address buses. A decision as to whether a new address should be loaded or a current address should be incremented can be based on a conditional expression and processor cycle results. PCAL 122 provides address signal 131 for bus 48, as well as provides control signals 128 and 129. Signal 131 indicates an address for reading and writing information from and to memory, and signals 128 and 129 are control signals for reading and writing such information. Micro instruction or firmware instruction is provided from memory 123 for addressing is provided on PCAL control signal 126.

Figure 8:
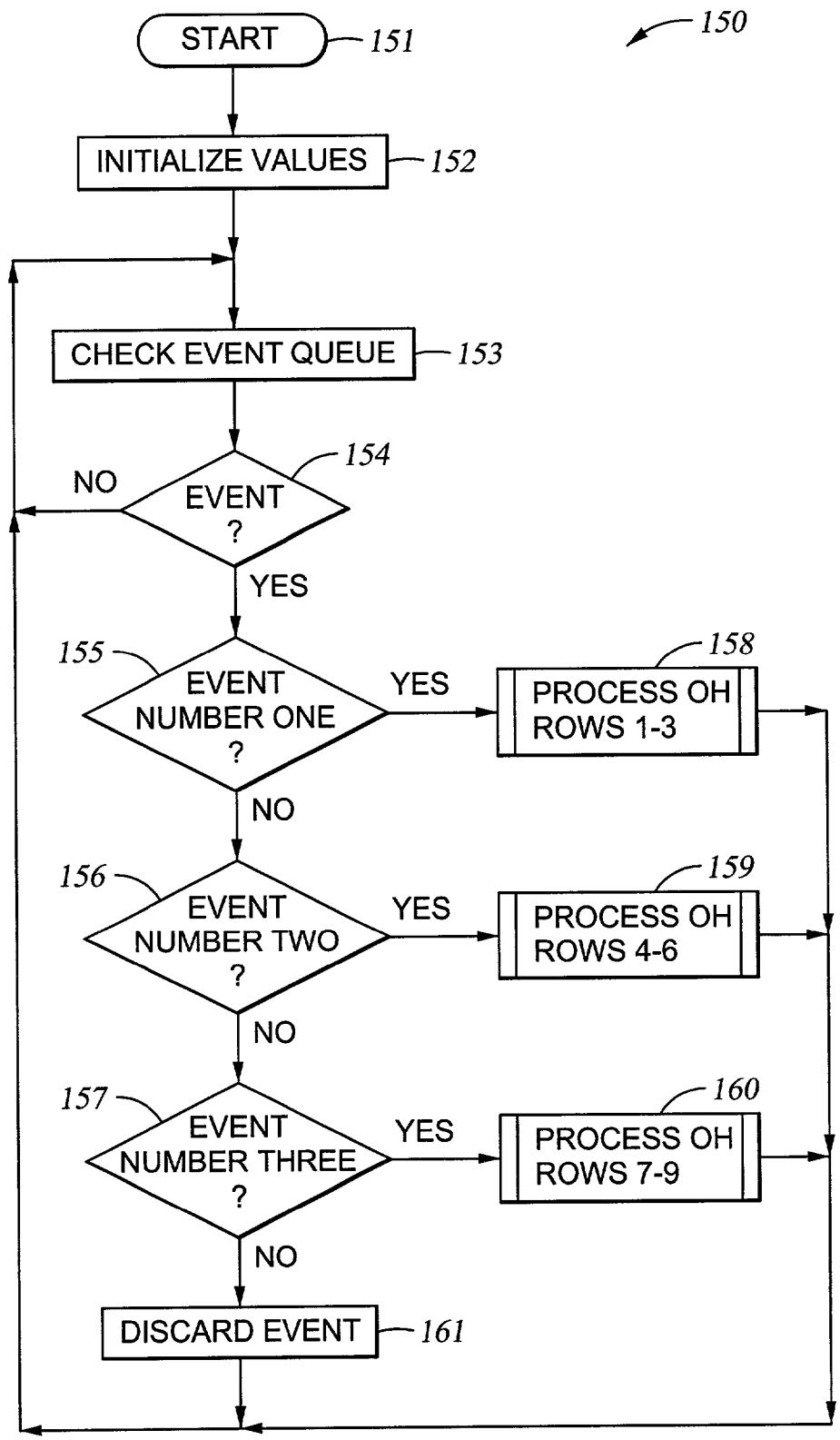
FIG. 8 is a flow chart of an exemplary portion of an embodiment of an event handling program for an overhead processor in accordance with an aspect of the present invention.

Referring to FIG. 8, there is shown a flow chart of an exemplary portion of event handling program 150 for overhead processor 42 (shown in FIG. 3) in accordance with an aspect of the present invention. Program 150 may be configured as microcode and stored in memory for operation of overhead processor 42 (shown in FIG. 3). At step 151, program 150 is begun, and at step 152 values are initialized. Such values may include a performance monitoring count, repetition counts and the like. At step 153, an event queue, which may be maintained in memory associated with ES 121 or memory 121M in ES 121 (shown in FIG. 7), is checked. At step 154, it is determined whether there are any events to process in such an event queue. If there are no such events, step 154 proceeds back to step 153 to check again. Accordingly, it should be understood that program 150 may be run continually to check for events to be scheduled.

If at step 154, there is an event to be scheduled, then a succession of deterministic steps 155, 156 and 157 are used to determine if such an event is a type one, two or three, respectively. If such an event is a type one, two or three, then a corresponding step 155, 156 or 157 where such an event was detected initiates a respective predefined subroutine 158, 159 or 160 to process associated overhead. Continuing the above example, event one corresponds to processing selected overhead from rows 1–3 of frame 30, namely a portion of SOH 39A bytes; and events two and three corresponds to processing selected overhead from rows 4–6 and 7–9, respectively, of frame 30, namely respective portions of LOH 39B bytes. Accordingly, it should be understood that such rows have been received by overhead processor system 4 of FIG. 3. Notably, rows 1–3, 4–6 and 7–9 corresponding to event types one, two and three, respectively, are for purposes of illustration, and other groupings of rows and events as mentioned above may be used in accordance with an aspect of the present invention.

After processing overhead corresponding to an event type at predefined subroutine 158, 159 or 160, respectively, program 150 returns to step 153 to check for another event to process. If, however, an event detected at step 154 is not any of event types check for at steps 155, 156 and 157, then at step 161 such an event is discarded, and program 150 returns step 153 to check for another event to process.

Figure 9:
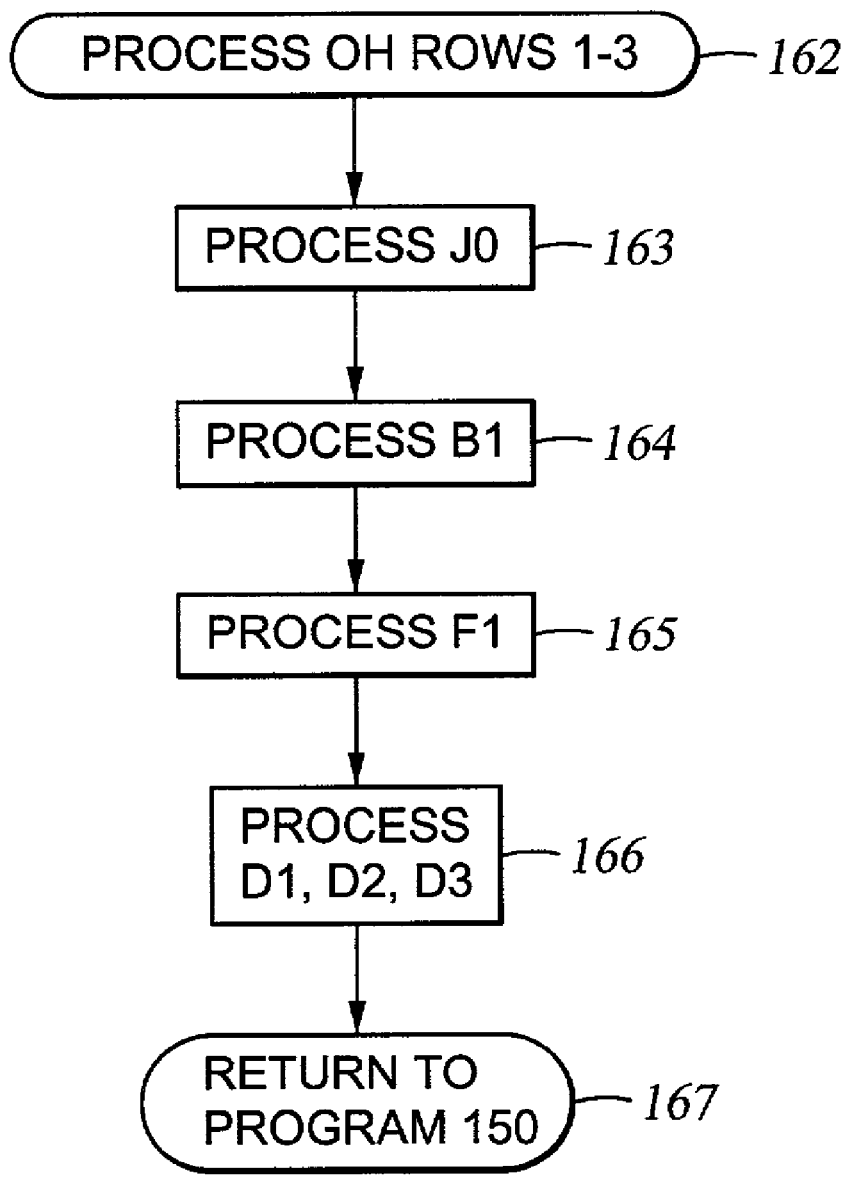
FIG. 9 is a flow chart of an exemplary portion of an embodiment of a predefined process routine in accordance with an aspect of the present invention.

Referring to FIG. 9, there is shown a flow chart of an exemplary portion of a predefined process subroutine 158 in accordance with an aspect of the present invention. Continuing the above example for purposes of illustration, at step 162, processing of overhead in rows 1–3 is initiated. At step 163, J0 overhead is processed. At step 164, B1 overhead is processed. At step 165, F1 overhead is processed. At step 166, D1, D2 and D3 overhead is processed. At step 167, routine 158 returns to program 150, such as at step 153. Predefined process subroutine 159 is for processing overhead bytes B2, K1, K2, D4, D5, D6, and predefined process subroutine 160 is for processing overhead from bytes D7, D8, D9, D10, D11, D12, S1, M0/M1, E2. Accordingly, subroutines 159 and 160, like subroutine 158, may branch out of and then back into program 150.

FIGS. 8 and 9 are described for processing of TOH only. However, POH may be processed in a like manner. Again, continuing the above example for purposes of illustration, in event one rows 1–3 are for processing bytes J1, B3, C2, in event two rows 4–6 are for processing bytes G1, F2, H4, and in event three rows 7–9 are for processing bytes F3/Z3, K3/Z4, N1/Z5.

Figure 10:
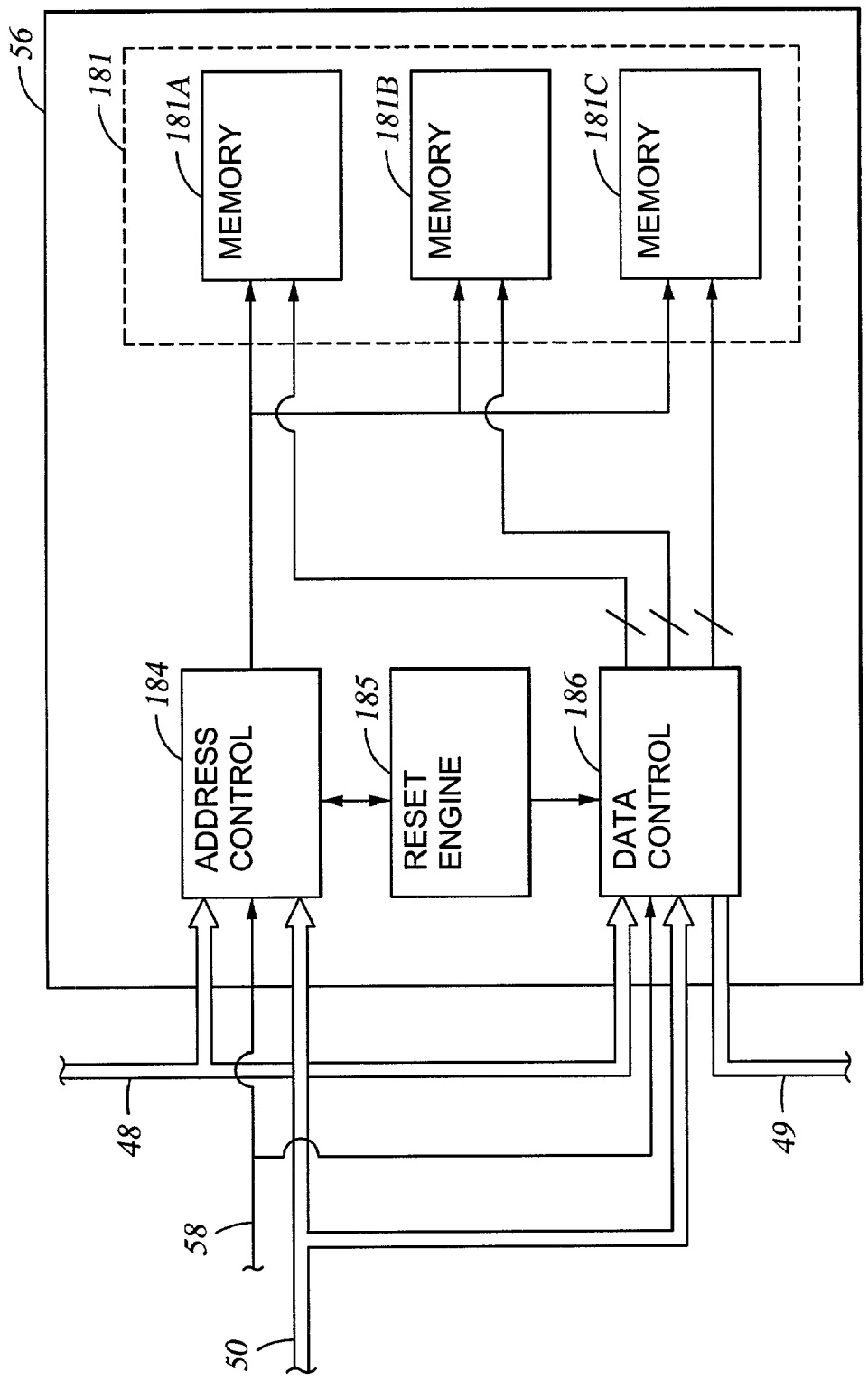
FIG. 10 is block diagram of an exemplary portion of an embodiment of a performance monitor in accordance with an aspect of the present invention.

Referring to FIG. 10, there is shown a block diagram of an exemplary portion of an embodiment of performance monitor 56 in accordance with an aspect of the present invention. Performance monitor 56 comprises address control 184, reset engine 185 and data control 186. Optionally, performance monitor comprises separate memory 181; however, other previously described memory may be used such as operational store 55. Memory 181 may be implemented using RAM, and more particularly, may be implemented using single port RAM. Though, for purposes of clarity, performance monitor 56 is described herein as having a separate memory 181 having three reserved address spaces or three memories 181A, 181B and 181C. With continuing reference to FIG. 10 and additional reference to FIGS. 3 and 4, operation of performance monitor 56 is described herein. Overhead and address information from overhead processor 42 is provided to data control 186 and address control 184, respectively, via bus 48. By way of example, if overhead processor 42 is to update performance information for this overhead, a previously stored count associated with such overhead is retrieved from an active performance monitoring status memory, for example memory 181A, using such address information and address control 184. Using data control 186, this retrieved count is increment using such overhead received and written back to memory 181A. In this manner, performance status may be maintained and updated in memory 181. Moreover, if overhead processor 42 requested performance information, for example above-described incremented count result, it may be provided to overhead processor 42 via bus 49.

However, in order to maintain currency of performance status and simultaneously allow user access to such information, when capture signal 58 is received, contents of memory, for example memory 181A, are written to another memory, for example memory 181B. Thus, memory 181B is now used for ongoing accumulation of overhead processing performance monitoring information, and memory 181A is a snap-shot of performance monitoring accumulation that is user accessible for example by external processor 70 via bus 50. A third memory, for example memory 181C, is cleared upon instruction from reset engine 185 to data control 186 and then to such memory. Memory 181A is maintained in a predetermined state, for example all ones or all zeros written to memory 181A by data control 186 addressed using address control 184, to be ready for coping memory contents for ongoing performance monitoring as described above with respect to memory 181B. Accordingly, by using three memories as described, one memory is maintained in an immediately available for state for copying data in order to maintain real-time performance monitoring while allowing for user access to performance data during operation of overhead processor system 4.

Figure 11:
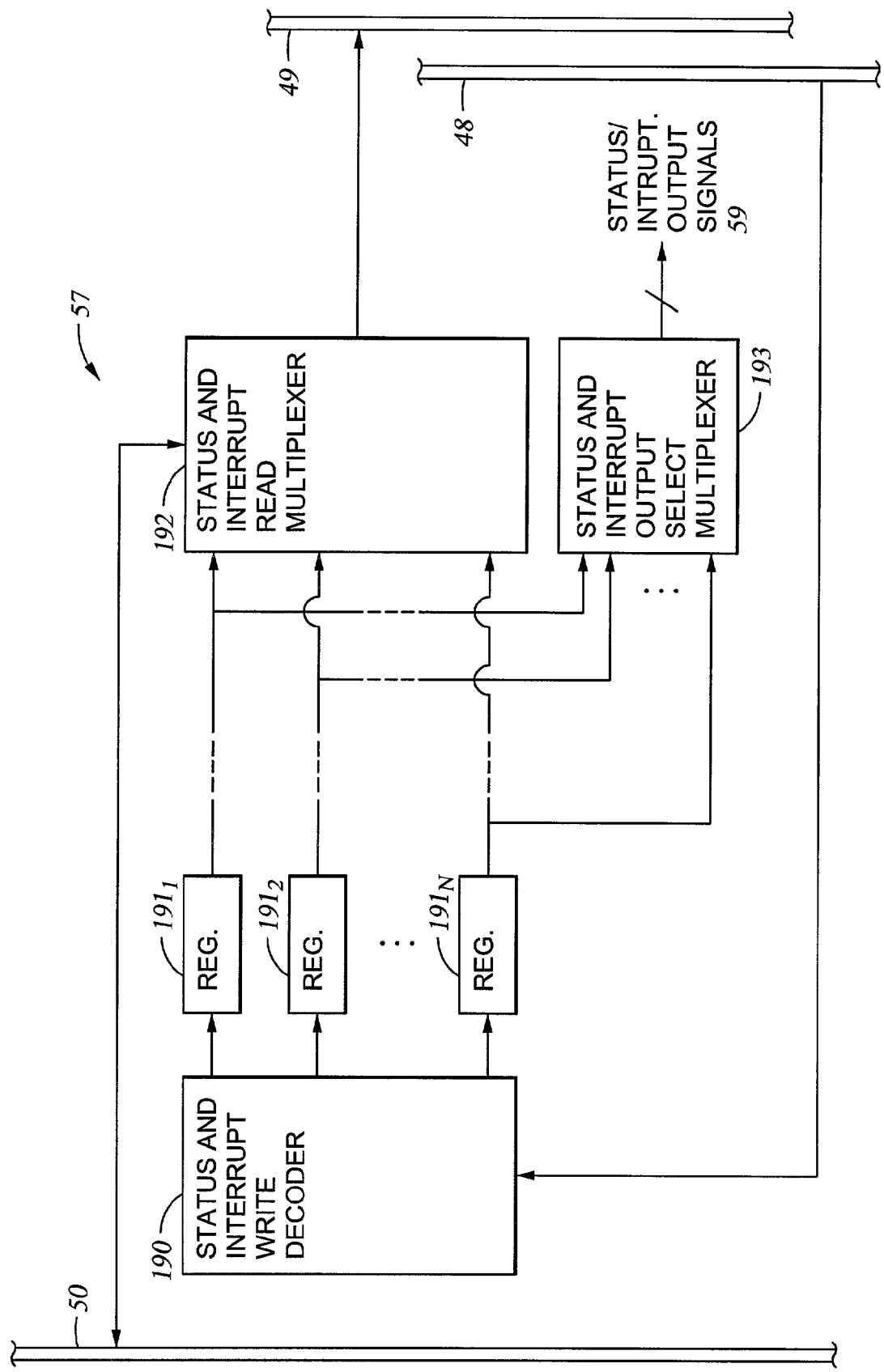
FIG. 11 is a block diagram of an exemplary portion of an embodiment of a status/interrupt module in accordance with an aspect of the present invention.

Referring to FIG. 11, there is shown a block diagram of an exemplary portion of status/interrupt module 57 in accordance with an aspect of the present invention. Status/interrupt module 57 comprises status and interrupt write decoder 190, a plurality of registers 191, status and interrupt read multiplexer 192, and status and interrupt output select multiplexer 193. With continuing reference to FIG. 11 and renewed reference to FIGS. 3 and 4, status/interrupt module 57 is described herein. Data is received from overhead processor 42 to write decoder 190 via bus 48. Decoder 190 decodes such incoming data and provides decoded data to registers 191. Registers 191 comprise 1 to N registers, for N an integer, for processing an N-bit wide data or a N-bit long word. Though registers are illustratively shown, other circuits may be used for temporarily holding a bit, such as flip-flops, latches and the like. Status/interrupt information is provided from registers 191 to status and interrupt read multiplexer 192, and to status and interrupt output select multiplexer 193. Multiplexer 192 is used for selecting status and interrupt information to provide as signals on bus 50 for external processor 70 or bus 49 for overhead processor 42. Multiplexer 193 is used for selecting status and interrupt information to provide as status/interrupt output signals 59. Though multiplexers 192 and 193 are illustratively shown, logic trees or other selection circuitry may be used.

Accordingly, it should be appreciated that an SDH or SONET overhead processing system has been described. Such a system complies with SDH and SONET standards, and introduces additional user features. Moreover, while not wishing to be bound by theory, it is anticipated that an overhead processor system in accordance with aspects of the present invention with save approximately 30 to 60 percent in semiconductor wafer area and save approximately 30 to 50 percent in power dissipation.

While foregoing is directed to the preferred embodiment of the present invention, other and further embodiments of the invention may be devised without departing from the basic scope thereof, and the scope thereof is determined by the claims that follow.

The invention claimed is:

1. An apparatus comprising:
   a descrambler configured to receive a data signal and partition out a first portion of overhead information and a payload envelope therefrom, the payload envelope comprising a second portion of overhead information and data;
   a first timing control coupled to the descrambler and configured to provide a first timing signal;
   a first submodule comprising a first overhead extractor, a first overhead event generator and a first checker, the first submodule coupled to the first timing control and the descrambler, the first submodule configured to receive the first portion of overhead information, to generate check first check values for checking a portion of the first portion of overhead information received and to generate a first event signal indicating receipt of the first portion of overhead information;
   a pointer interpreter coupled to the first timing control and the descrambler;
   a buffer memory coupled to the first timing control and the descrambler to receive the payload envelope;
   a second timing control coupled to the buffer memory and configured to provide a second timing signal; and
   a second submodule comprising a second overhead extractor, a second overhead event generator and a second checker, the second submodule coupled to the buffer memory and to the second timing control, the second submodule configured to receive the second portion of overhead information, to generate second check values for checking a portion of the second portion of overhead information received and to generate a second event signal indicating the second portion of overhead information has been received.

2. The apparatus of claim 1 wherein the first portion of overhead information comprises transport overhead information.

3. The apparatus of claim 2 wherein the second portion of overhead information comprises path overhead information.

4. The apparatus of claim 1 wherein the first overhead extractor and the second overhead extractor each comprise memory.

5. The apparatus of claim 1 wherein the first timing control and the second timing control each comprise a flywheel counter.

6. The apparatus of claim 1 wherein the first portion of overhead information and the second portion of overhead information are in a Synchronous Digital Hierarchy configuration.

7. The apparatus of claim 1 wherein the first portion of overhead information and the second portion of overhead information are in a Synchronous Optical Network configuration.

8. The apparatus of claim 1 wherein the first event signal is provided every third row of overhead.

9. The apparatus of claim 1 wherein the first event signal is provided for each row of overhead.

10. The apparatus of claim 1 wherein the first event signal is provided for each frame.

11. An apparatus comprising:
timing control;
an elastic store coupled to the timing control;
a pointer generator coupled to the elastic store and to the timing control;
a submodule coupled to the pointer generator and to the timing control, the submodule comprising an overhead substitute, an overhead event generator, an alarm indication signal generator and a checker, the submodule is configured to insert generated overhead for an output stream, to generate an alarm signal, to calculate and insert parity bits in the output stream, and to generate an event signal to indicate the output stream has been transmitted; and a scrambler coupled to the submodule, the elastic store and to the timing control, the scrambler is configured to receive the output stream, a payload envelope and a frame-based timing signal to provide a frame-synchronized data signal, the frame-synchronized data signal comprising data and overhead.

12. The apparatus of claim 11, wherein the generated overhead comprises overhead generated in advance of when the generated overhead is to be inserted into a frame of the output stream.

13. The apparatus of claim 11, wherein the generated overhead includes one or more Synchronous Optical Network configuration overhead bytes and Synchronous Digital Hierarchy configuration overhead bytes.

14. The apparatus of claim 11, wherein the overhead event generator is configured to:
signal that generated overhead has been transmitted; and
signal that overhead is to be generated for a next frame.

* * * * *